（12）United States Patent
Liu et al.

(10) Patent No.: US 8,159,574 B2
(45) Date of Patent: Apr. 17, 2012

(54) IMAGING ARRAY WITH BUILT-IN EXPOSURE CONTROL

(75) Inventors: Xinqiao Liu, Mountain View, CA (US); Boyd Fowler, Sunnyvale, CA (US)

(73) Assignee: BAE Systems Imaging Solutions, Inc., Milpitas, CA (US)

( * ) Notice: Subject to any disclaimer, the term of this patent is extended or adjusted under 35 U.S.C. 154(b) by 392 days.

(21) Appl. No.: 12/330,178

(22) Filed: Dec. 8, 2008

(65) Prior Publication Data

US 2010/0141817 A1    Jun. 10, 2010

(51) Int. Cl.
*H04N 3/14* (2006.01)
(52) U.S. Cl. .......................................... 348/294; 348/299
(58) Field of Classification Search ................... 348/294, 348/299
See application file for complete search history.

(56) References Cited

U.S. PATENT DOCUMENTS

| | | | | |
|---|---|---|---|---|
| 4,809,073 | A * | 2/1989 | Chiba et al. | 348/314 |
| 5,043,571 | A * | 8/1991 | Hasegawa | 250/226 |
| 6,646,683 | B1 * | 11/2003 | Mandle | 348/299 |
| 6,833,871 | B1 * | 12/2004 | Merrill et al. | 348/302 |
| 7,541,571 | B2 * | 6/2009 | Lee | 250/214.1 |
| 2006/0038207 | A1 * | 2/2006 | Hong et al. | 257/292 |

* cited by examiner

*Primary Examiner* — James Hannett
(74) *Attorney, Agent, or Firm* — Calvin B. Ward

(57) ABSTRACT

An imaging array and method for using the same to capture an image are disclosed. The imaging array includes an array of pixel sensors and a controller. Each pixel sensor includes a dual-ported photodiode characterized by ports having first and second gates, and a charge conversion circuit. The charge conversion circuit generates a signal that is a function of a charge on the dual-ported photodiode when the first gate in the dual-ported photodiode is activated to transfer a charge on the dual-ported photodiode to the charge conversion circuit. The controller applies a potential to the second gates and measures a current flowing out of the second gates, each second port passing charge stored in the photodiode connected to the second port when a potential in the photodiode exceeds the applied potential. The controller determines an average light intensity incident on the array of pixel sensors.

18 Claims, 6 Drawing Sheets

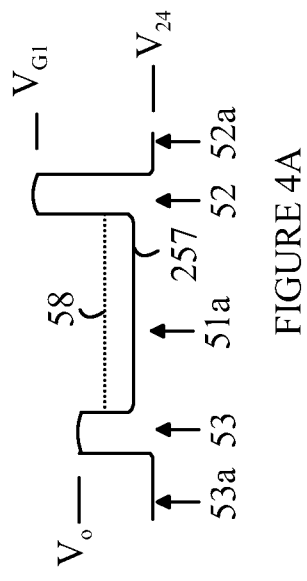
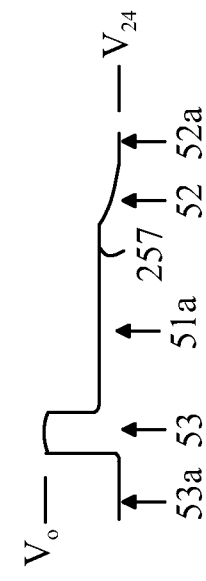
FIGURE 4A
FIGURE 4B
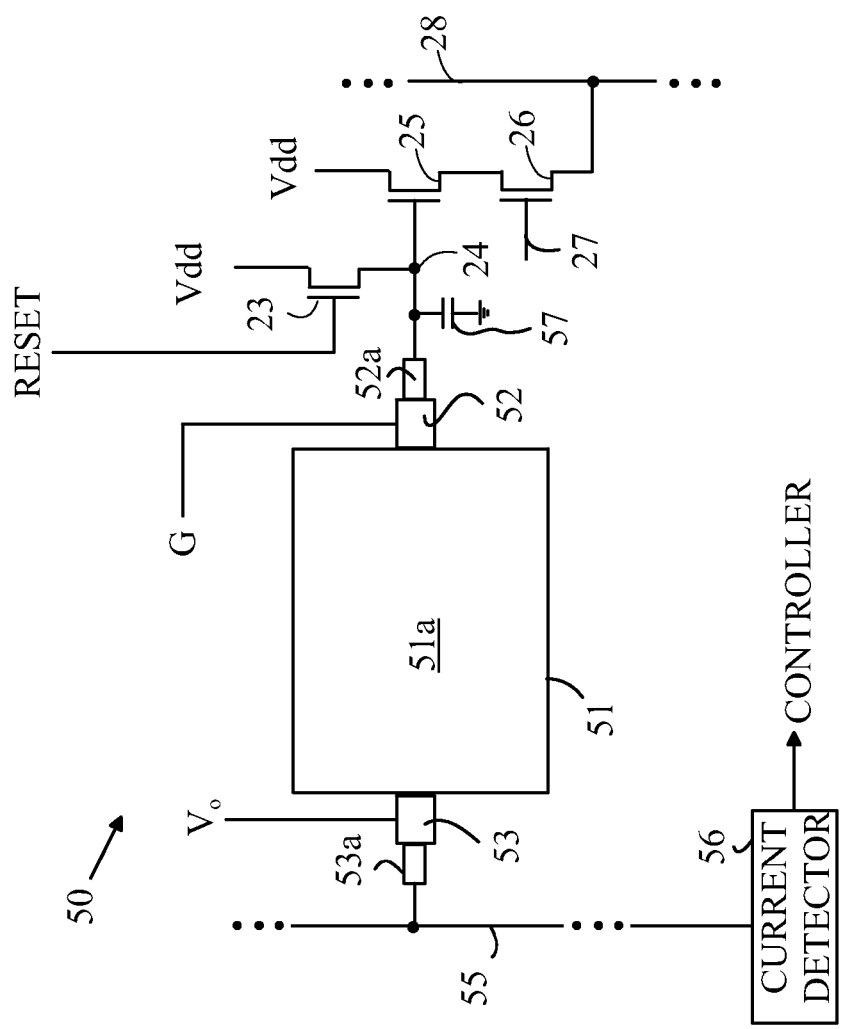
FIGURE 3

IMAGING ARRAY WITH BUILT-IN EXPOSURE CONTROL

BACKGROUND OF THE INVENTION

Inexpensive cameras based on CMOS imaging arrays are now found in a number of devices such as cellular telephones and PDAs. These cameras provide automatic exposure control based on the image received by the imaging array itself. These cameras utilize an electronic shutter to capture the image. The exposure time is determined by continually reading out the image and adjusting the exposure time such that the image, on average, is neither overexposed nor underexposed. Each pixel in the imaging array has a linear range in which the pixel generates a charge that is proportional to the light received during the exposure time. If the pixel is overexposed, the excess charge is lost, and hence, the pixel output remains at some maximum value independent of the light exposure.

Analogous problems occur if the light levels are too low. During the image readout, the charge in each pixel is readout and converted to a digital value. The accuracy of the analog-to-digital converter (ADC) and noise levels in the pixel set the lower limit on image intensity that can be accurately captured. If the light levels are less than the levels corresponding to one count in the output of the ADC, all of the light levels will be assigned the same numerical value.

The goal of the exposure control system is to maintain the exposure time in a range that assures that most of the pixels have outputs in the linear region. In one type of prior art system, a frequency distribution of the intensity values from the various pixels in the imaging array is generated for each exposure time. If the image is overexposed, the distribution will be concentrated at or near the maximum allowed intensity value. Similarly, if the image is underexposed, the distribution will be concentrated in the low pixel intensity values. This type of scheme requires that the entire image be readout and processed at each exposure time.

For imaging arrays having millions of pixels and inexpensive processors, the readout time can be too long to provide good exposure control. This is particularly true in situations in which the scene to be captured is changing rapidly. Live performances often involve scenes that are changing rapidly because the performers are moving around the stage and various lighting effects are actuated for short periods of time. By the time the processor in the camera determines the correct exposure time, the scene will have changed and that exposure time will no longer be valid. As a result, the cameras provided in cellular telephones and the like are of limited use in capturing scenes from such events.

SUMMARY OF THE INVENTION

The present invention includes an imaging array and method for using the same to capture an image. The imaging array includes an array of pixel sensors and a controller. Each pixel sensor in the array includes a dual-ported photodiode characterized by ports having first and second gates, and a charge conversion circuit. The charge conversion circuit generates a signal that is a function of a charge on the dual-ported photodiode when the first gate in the dual-ported photodiode is activated to transfer a charge on the dual-ported photodiode to the charge conversion circuit. The controller applies a potential to the second gates in the dual-ported photodiodes and measures a current flowing out of the second gates, each second port passing charge stored in the photodiode connected to the second port when a potential in the photodiode exceeds the applied potential. The controller determines an average light intensity incident on the array of pixel sensors. In one aspect of the invention, the controller measures the current flowing out of the second gates as a function of the potential applied to the second gates after the array of pixel sensors has been exposed to an image. In another aspect of the invention, the controller measures the current flowing out of the second gates during an image exposure and terminates the exposure if the current exceeds a predetermined threshold value.

In a still further aspect of the invention, the second ports of the dual-ported photodiodes in a sub-set of the pixel sensors are connected to an overflow bus and the controller measures a current flowing in the overflow bus, the sub-set of the pixel sensors omitting at least one pixel sensor from the array of pixel sensors. The sub-set of the pixels includes pixels in a predetermined region of the imaging array and not pixels in other regions.

In another aspect of the invention, one of the dual-ported photodiodes includes a third port having a third gate and the controller controls a potential on the third gate. The second port of the dual-ported photodiode is connected to a first overflow bus, and the third port of the dual-ported photodiode is connected to a second overflow bus. The controller measures a current flowing in the first overflow bus or the second overflow bus.

BRIEF DESCRIPTION OF THE DRAWINGS

FIG. 3 is a schematic drawing of an embodiment of a pixel that is utilized in one embodiment of an imaging array according to the present invention.

FIGS. 4A and 4B illustrate the potential distribution as seen by a photoelectron in a photodiode and the gates connecting the photodiode to the other circuitry in pixel 50.

DETAILED DESCRIPTION OF THE PREFERRED EMBODIMENTS OF THE INVENTION

Figure 1:
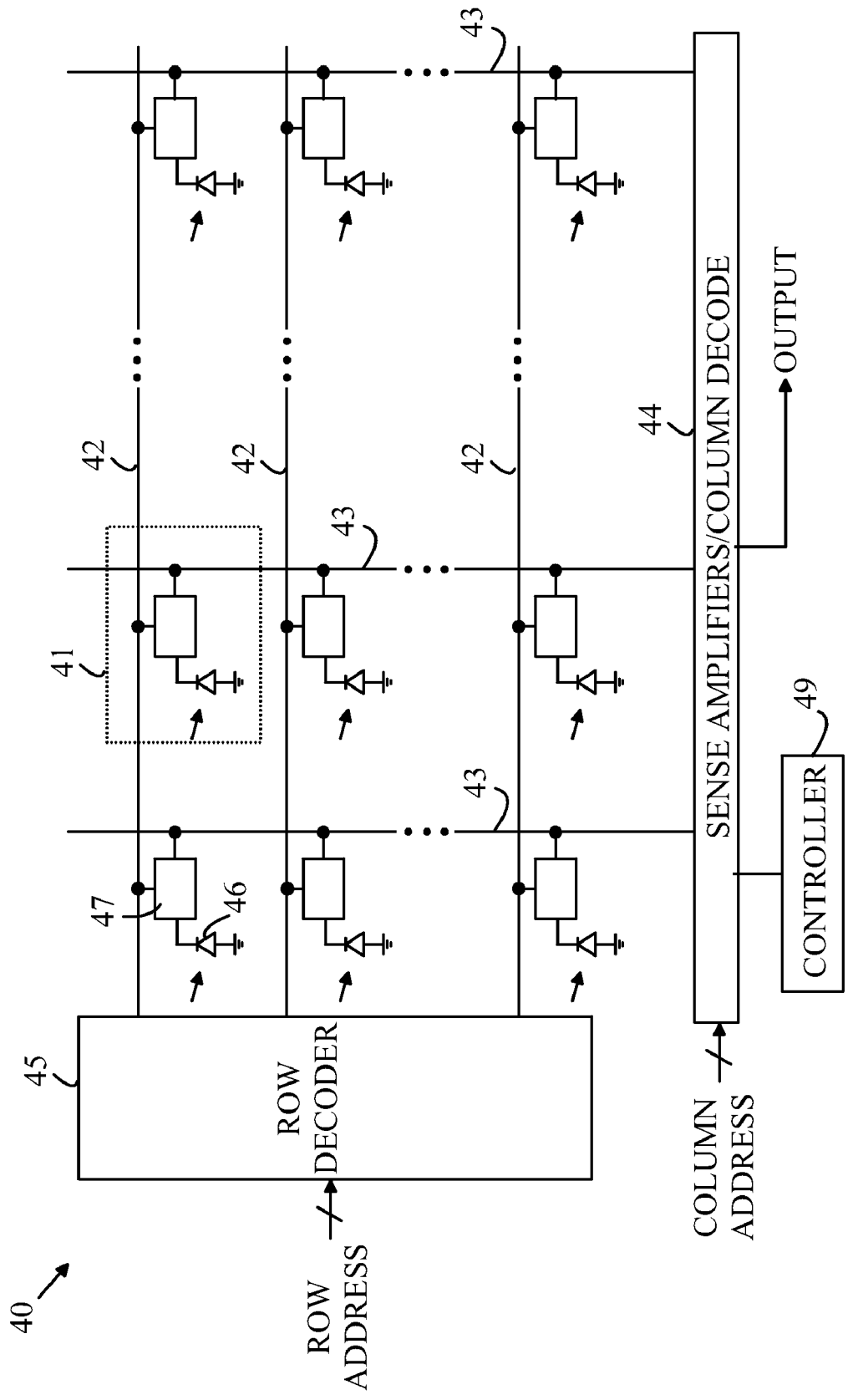
FIG. 1 is a schematic drawing of a prior art CMOS imaging array.

The manner in which the present invention provides its advantages can be more easily understood with reference to FIG. 1, which is a schematic drawing of a prior art CMOS imaging array. Imaging array 40 is constructed from a rectangular array of pixels 41. Each pixel includes a photodiode 46 and an interface circuit 47. The details of the interface circuit depend on the particular pixel design. However, all of the pixels include a gate that is connected to a row line 42 that is used to connect that pixel to a bit line 43. The specific row that is enabled at any time is determined by a row address that is input to a row decoder 45. The row select lines are a parallel array of conductors that run horizontally in the metal layers over the substrate in which the photodiodes and interface circuitry are constructed.

The various bit lines terminate in a column processing circuit 44 that typically includes sense amplifiers and column decoders. The bit lines are a parallel array of conductors that run vertically in the metal layers over the substrate in which the photodiode and interface circuitry are constructed. Each sense amplifier reads the signal produced by the pixel that is currently connected to the bit line processed by that sense amplifier. The sense amplifiers may generate a digital output signal by utilizing an ADC. At any given time, a single pixel is readout from the imaging array. The specific column that is readout is determined by a column address that is utilized by a column decoder to connect the sense amplifier/ADC output from that column to circuitry that is external to the imaging array. The various timing operations and address generation is carried out by a controller 49.

To provide low noise, all of the electrons must be removed from the photodiodes when the photodiodes are reset at the beginning of an exposure. To reduce dark current and to ensure complete reset, pinned photodiodes are utilized. In a pinned photodiode, the charge generated by the photons is stored in a potential well that is at a lower potential than the region in which the charge is generated. The storage region is adjacent to a gate transistor. When the gate transistor is placed in a conductive state, all of the charge moves out of the gate onto a node that is held at a potential that assures that all of the charge will leave the photodiode, and hence, the photodiode can be reset. A photogate type of detector that operates in accumulation mode could also be used to reduce dark current.

Figure 2:
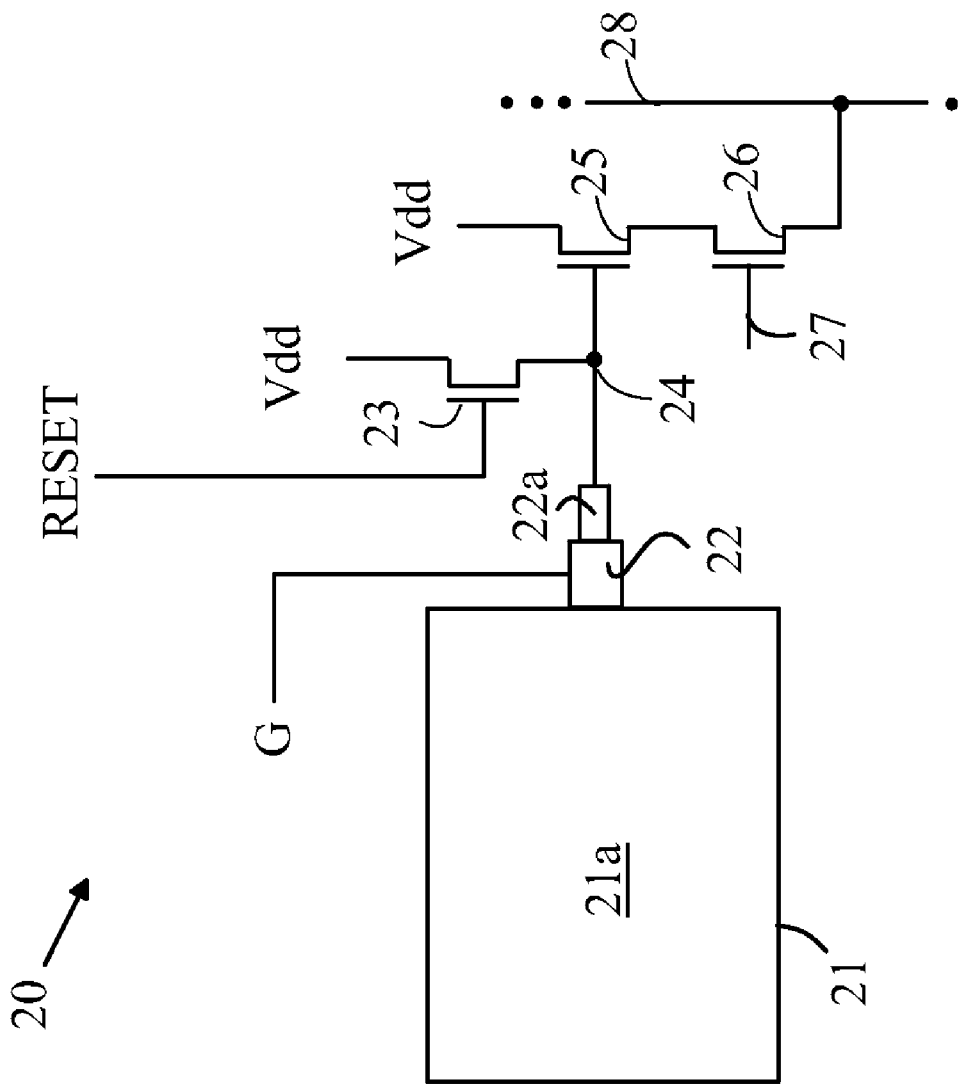
FIG. 2 is a schematic drawing of a prior art pixel that is commonly used in CMOS imaging arrays.

Refer now to FIG. 2, which is a schematic drawing of a prior art pixel that is commonly used in CMOS imaging arrays. Pixel 20 includes four transistors and is often referred to as a 4-transistor pixel cell. Photodiode 21 occupies most of the area of the pixel. Photodiode 21 includes an implant region 21a and a gate 22 that couples the implant region to node 24. Implant region 21a is doped such that the potential of implant region 21a is raised above that of 22a by enough to allow any charge accumulated in implant area 21a to flow to drain region 22a when gate 22 is placed in the conducting state. Photodiode 21 is reset prior to the image exposure by placing gates 22 and 23 in the conductive state, such that the cathode of photodiode 21 is connected to $V_{dd}$. After the reset operation, gates 22 and 23 are placed in the non-conductive state. During the image exposure, a charge that is related to the light exposure is stored adjacent to gate 22 in photodiode 21. Gate 22 is held at a potential that is sufficient to block that charge from leaving implant area 21a. During readout, charge from photodiode 21 is gated onto node 24 by gate 22 and converted to a voltage by transistor 25. When pixel 20 is selected by a signal on row line 27, transistor 26 applies this voltage to bit line 28.

Refer now to FIG. 3, which is a schematic drawing of an embodiment of a pixel that is utilized in one embodiment of an imaging array according to the present invention. Pixel 50 includes a photodiode 51 having an implant area 51a that is doped to provide a potential that is above the potential of region 52a when gate 52 is at a potential that allows current to flow from implant area 51a to region 52a. Photodiode 51 is also connected to a second drain region 53a by gate 53 that is held at a potential $V_o$ that may be varied during the operation of pixel 50. Drain region 53a is connected to a bus 55 that is maintained at a potential that allows any current leaving photodiode 51 through gate 53 to flow to a current detector 56 that measures the current flowing in bus 55. A controller in an imaging array according to the present invention uses the current measurement to determine the correct exposure time for the image that is being projected on the imaging array. The remaining elements of pixel 50 function in a manner analogous to that described above with reference to pixel 20, and hence, have been given the same numeric designations and will not be discussed further here.

Refer now to FIGS. 4A and 4B, which illustrate the potential distribution as seen by a photoelectron in photodiode 51 and the gates connecting photodiode 51 to the other circuitry in pixel 50. FIG. 4A illustrates the potential profile during the accumulation of charge during an image exposure. At the start of the exposure the potential in region 51a is as shown at 257. The gates on each side of region 51a are set to provide potential barriers $V_{G1}$ and $V_o$. It will be assumed that $V_o$ is less than $V_{G1}$ for reasons that will be discussed in more detail below. As photoelectrons are accumulated in region 51a, the potential increases as shown at 58.

Refer now to FIG. 4B. Assume that pixel 20 is readout prior to the potential in region 51a reaching $V_o$. Pixel 20 is readout by lowering the potential barrier at gate 52 to a value below potential 257. As a result, any charge stored in region 51a will flow to node 24 and be stored on the parasitic capacitor 57. Capacitor 57 converts the charge to a potential that is proportional to the amount of charge that was transferred. It is assumed that the maximum voltage on capacitor 57 is less than the potential shown at 52, and hence, the entire contents of the photodiode are emptied at readout.

Figure 5:
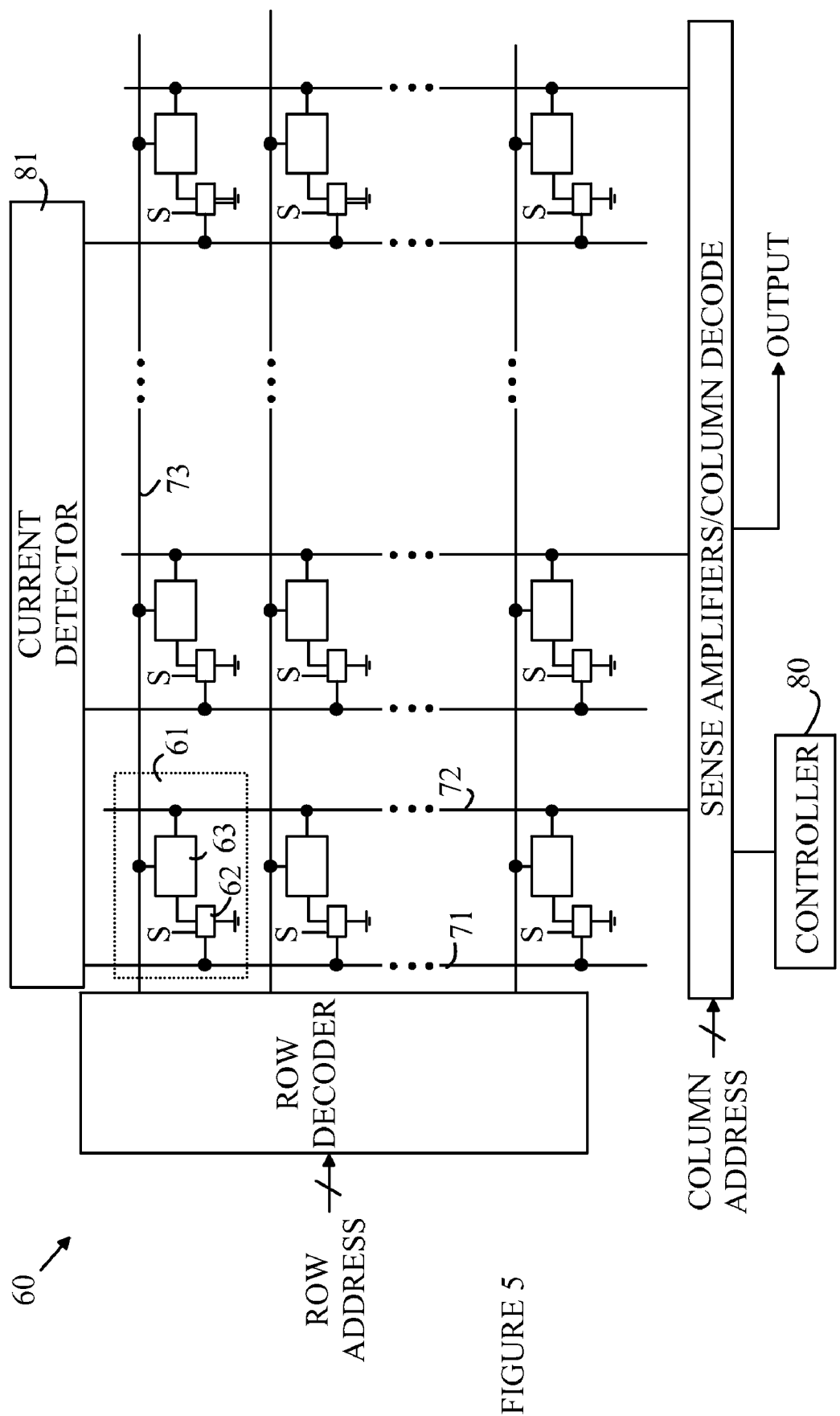
FIG. 5 illustrates one embodiment of an imaging array according to the present invention.

To simplify the following discussion, a pinned photodiode having two independent gates for emptying charge from that photodiode will be referred to as a "dual-ported" photodiode in the following discussion. Refer now to FIG. 5, which illustrates one embodiment of an imaging array according to the present invention. Imaging array 60 is constructed from pixels having dual-ported photodiodes.

A typical pixel is labeled at 61. Pixel 61 includes a dual-ported photodiode 62 having one port connected to a conventional readout circuit 63 that operates in a manner analogous to that described above with reference to interface circuit 47 shown in FIG. 1. That is, the contents of the dual-ported photodiode are readout on bit line 72 when a row select signal is provided on row line 73. Dual-ported photodiode 62 is also reset by circuitry in readout circuit 63 in a manner analogous to that described above with reference to interface circuit 47 shown in FIG. 1. To simplify the drawings, the reset and gate control lines for the first port have been omitted from the drawing. However, it is to be understood that these lines connect each pixel to controller 80, which manages the various readout and reset functions.

The second port is connected to bus 71. A signal denoted by S in FIG. 5 determines the potential, $V_o$, on the gate associated with the second ports. By altering S, the charge level at which charge leaks out of each photodiode onto bus 71 can be controlled. Refer again to FIG. 4A. If the potential in region 51a exceeds $V_o$ during the accumulation of charge in the image exposure phase, the excess current will leak out of region 51a to drain 53a and be coupled to current detector 56 by bus 55 as shown in FIG. 3. Bus 55 is maintained at a potential below $V_o$ and preferably below the potential shown at 257. Referring again to FIG. 5, the level S is set by controller 80 through current detector 81; however, to simplify the drawing, these signal connections have been omitted from the drawing.

The buses, such as bus 71, that connect the second ports of the dual-ported photodiode to current detector 81 will be referred to as the overflow buses in the following discussion. Current detector 81 measures the current on the overflow buses and reports the results to controller 80. Again, to simplify the drawing, the connections between current detector 81 and controller 80 have been omitted.

Refer again to FIG. 4A. Consider the case in which the $V_o$ is less than the potential 257, and drain region 53a is also held at a potential below potential 257. In this case, any photoelectrons that are generated in region 51a will flow out of photodiode 51 onto bus 55 as soon as the photoelectrons are generated. Hence, the current measured by current detector 81 is the average photocurrent on the array, which is proportional to the average light level on the array. Accordingly, controller 80 can utilize this value to estimate the correct exposure to use in taking a picture. It should also be noted that the dual-ported photodiodes are maintained in a reset condition during this process, since any photodiodes collected by the dual-ported photodiodes are immediately flushed onto the overflow buses. Hence, an exposure can be commenced merely by switching the second gates in the dual-ported photodiodes to a non-conducting state by raising the potential on those gates, i.e., changing the level of signal S.

In the above-described embodiments, it was assumed that each overflow bus is shared by all of the pixels in a given column and that current detector 81 measures the sum of the currents on these buses. However, other arrangements can also be utilized to provide a more detailed analysis of the light pattern on the imaging array. For example, the current on the individual overflow buses can be measured separately to provide an estimate of the light intensity pattern across the imaging array.

In the above-described embodiments, the overflow buses run parallel to the bit lines. That is, each pixel in a given column is connected to the same overflow bus. However, other arrangements could be utilized. For example, each pixel in a given row could be connected to the same overflow bus. In this case, the current detector could measure the light intensity pattern on a row-by-row basis.

In many cases, the range of light intensities can be greater than the range of intensities that can be accommodated by the pixels and the associated ADC circuitry in column decode circuitry. For example, if the range of light intensities varies over a factor of 10,000, and the ADC circuitry provides 12 bits of resolution, the intensity range cannot be accommodated without either overexposing or underexposing some of the pixels. In more expensive cameras, the decision as to which pixels will be assured as receiving the correct exposure utilizes exposure schemes that sample the light distribution using a weighted average of specified pixels. Typically, the pixels near the center of the imaging array are given more weight in some modes, as it is assumed that the camera user has placed the subject of interest in or near the center of the visual field.

The present invention is well adapted for implementing more complex averaging of the image intensity. In one aspect of the present invention, the overflow buses are metal lines that are run in one of the conventional CMOS metal layers that overlie the silicon circuitry. Hence, a single bus that connects an arbitrary set of pixels can be implemented to provide an average exposure as seen by those pixels by connecting the second port in each pixel of interest to a conductor in a corresponding metal layer. The remaining pixels can be connected to other buses to provide additional intensity information.

In the above-described embodiments, the level on the gate of the second port in each dual-ported photodiode was set sufficiently low to ensure that all of the charge accumulated in the photodiode was transferred to the overflow bus as the charge was generated during the calculation of the correct exposure time. However, by controlling the potential on these gates, more detailed information about the light intensity distribution in the image can be obtained.

In one aspect of the present invention, controller 80 and current detector 81 measure the current on the overflow buses as a function of the potential on the gates associated with the second port of each dual-ported photodiode. To simplify the following discussion, the gates associated with the second port of each dual-ported photodiode will be referred to as the second port gates. Consider the case in which the photodiodes are reset and the potential on the second port gates is set sufficiently high that none of the photodiodes overflow during a first time period. At the end of that time period, each photodiode will have accumulated a charge indicative of the amount of light that was received by that photodiode during the first time period. Consider the case in which the potential on the gates associated with the second port of each dual-ported photodiode is now lowered by a first increment from an initial value $V_1$ to $V_2$. In each photodiode that had accumulated sufficient charge to have a potential greater than $V_2$, the excess charge will flow out of that photodiode and onto the overflow bus connected to that dual-ported photodiode. In this embodiment, controller 80 utilizes the signal from current detector 81 to compute the integral of the current on the overflow buses to obtain a charge value $Q_1$. The potential on the second port gates is then lowered by a second increment from $V_2$ to $V_3$, and the current on the overflow buses is integrated to provide a corresponding charge value $Q_2$, and so on.

Each charge value provides an estimate of the number of pixels that received an exposure greater than a corresponding light exposure during the first time period. If the increments by which the potential on the second port gates is reduced correspond to equal charge increments on the photodiodes, the differences between successive $Q_i$ values provide a histogram of the distribution of light intensities over the imaging array. It should be noted that this histogram can be generated without reading out the individual pixels over the bit lines, and hence, can be generated in a time that is a small fraction of the time needed to generate a corresponding histogram by reading out an image and generating a histogram of the intensity values in the pixels that are connected to the overflow buses in question.

Once an exposure time has been computed, the current flow on the overflow buses can be utilized to monitor the exposure and terminate the exposure early if the image is too bright at the time the image is actually being recorded. Refer again to FIG. 3. In this aspect of the present invention, during the exposure, the potential on gate 53 is set at a value that is slightly less than the potential on gate 52. If during the exposure, the potential in photodiode 51 exceeds the potential on gate 53, charge will leak out of photodiode 51 onto overflow bus 55. If the exposure time was correctly set, very few photodiodes should leak charge in this manner, since the exposure should terminate before most of the photodiodes reach saturation. Hence, a current above a predetermined threshold value on bus 55 during the exposure can be used to detect an image that was brighter than expected. In this case, the exposure can be prematurely terminated by the controller to prevent an overexposure condition.

In the arrangement shown in FIG. 5, there is one overflow bus per column of pixels; however, the second port gates on a particular two-dimensional sub-array of pixels could likewise be connected to a separate overflow bus, and hence, the magnitude of the saturation occurring within that sub-set could be measured. One sub-set of interest in many camera designs is the set of pixels near the center of the imaging array, since the camera user tends to center the region of interest in the image within the frame of the camera. Accordingly, in this mode of operation, the potential on the second port gates in the pixel sensors is altered during the exposure to minimize the saturation of these pixels while extending the dynamic range of the pixels.

Figure 6:
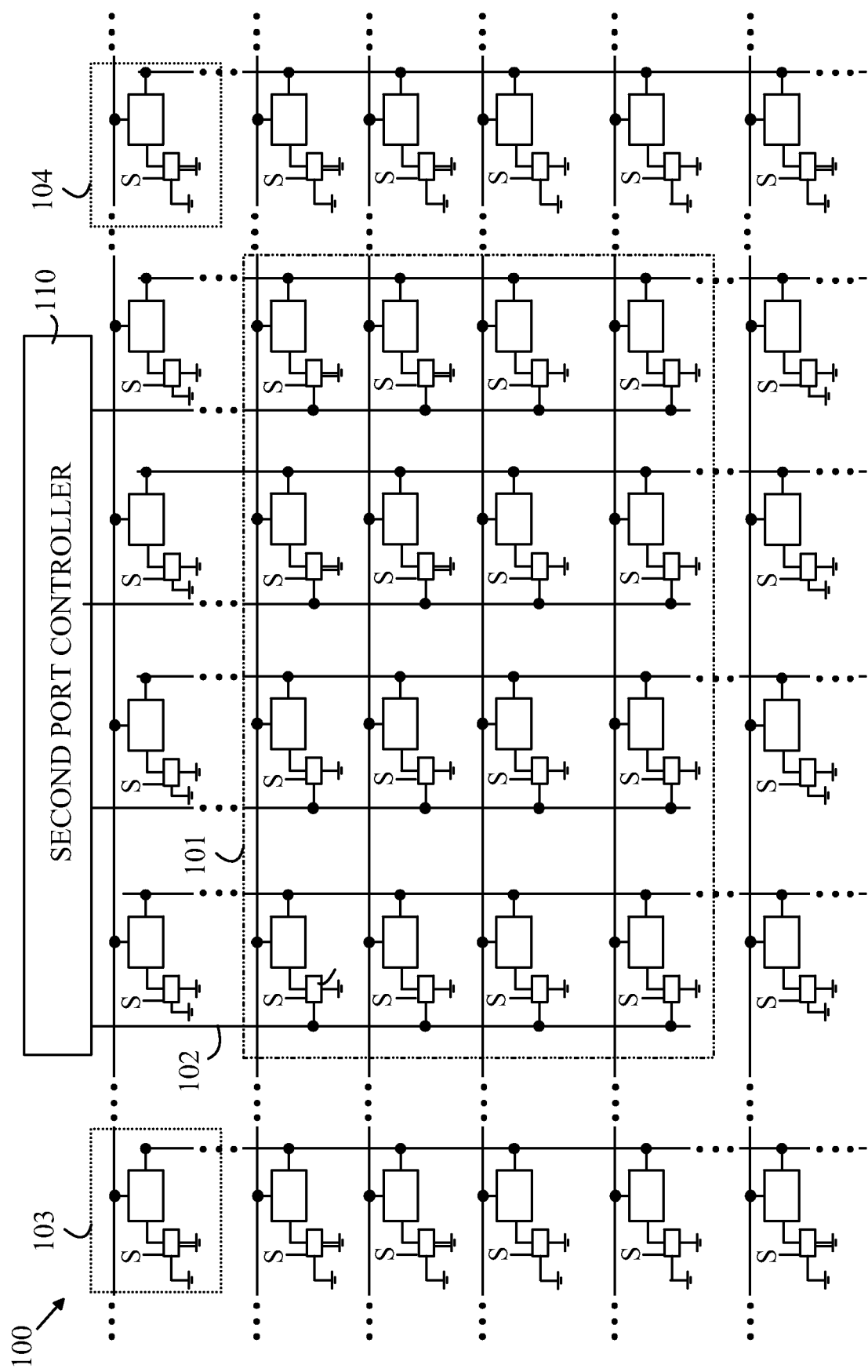
FIG. 6 illustrates a portion of an imaging array according to another aspect of the present invention.

Refer now to FIG. 6, which illustrates a portion of an imaging array according to another aspect of the present invention. Imaging array 100 differs from imaging array 60 discussed above in that the pixel sensors in the central region 101 of the imaging array have drain regions connected to overflow buses such as bus 102. The overflow buses are monitored by second port controller 110, which also controls the potential on the gates of all of the second ports. The drain regions of the second ports in the pixel sensors outside the central regions such as pixel sensors 103 and 104 are connected to $V_{dd}$ or another suitable potential to guarantee that any charge that leaks out of the photodiodes through these ports is removed. This arrangement allows the array controller, such as controller 80 shown in FIG. 5, to calculate the desired exposure using the central region of the image. For many applications, the camera user centers the scene of interest on the imaging array; hence, the exposure calculated from this region is better suited for this type of photography.

The arrangement shown in FIG. 6 utilizes a particular sub-set of the pixels for computing the exposure and controlling the exposure during the actual image acquisition. However, other sub-sets of pixels could be utilized for different photographic conditions. For example, when photographing sunsets, the upper half of the imaging array contains the scene of interest, and hence, a sub-set of pixels corresponding to the upper half of the imaging array could be utilized in computing the exposure and controlling the image acquisition.

It is clear from the above-described embodiments of the present invention that there are a number of different sub-sets of pixels that provide advantages in different photographic situations. Hence, it would be advantageous to provide an exposure control system that can accommodate different subsets of pixels for use in different photographic situations.

Figure 7:
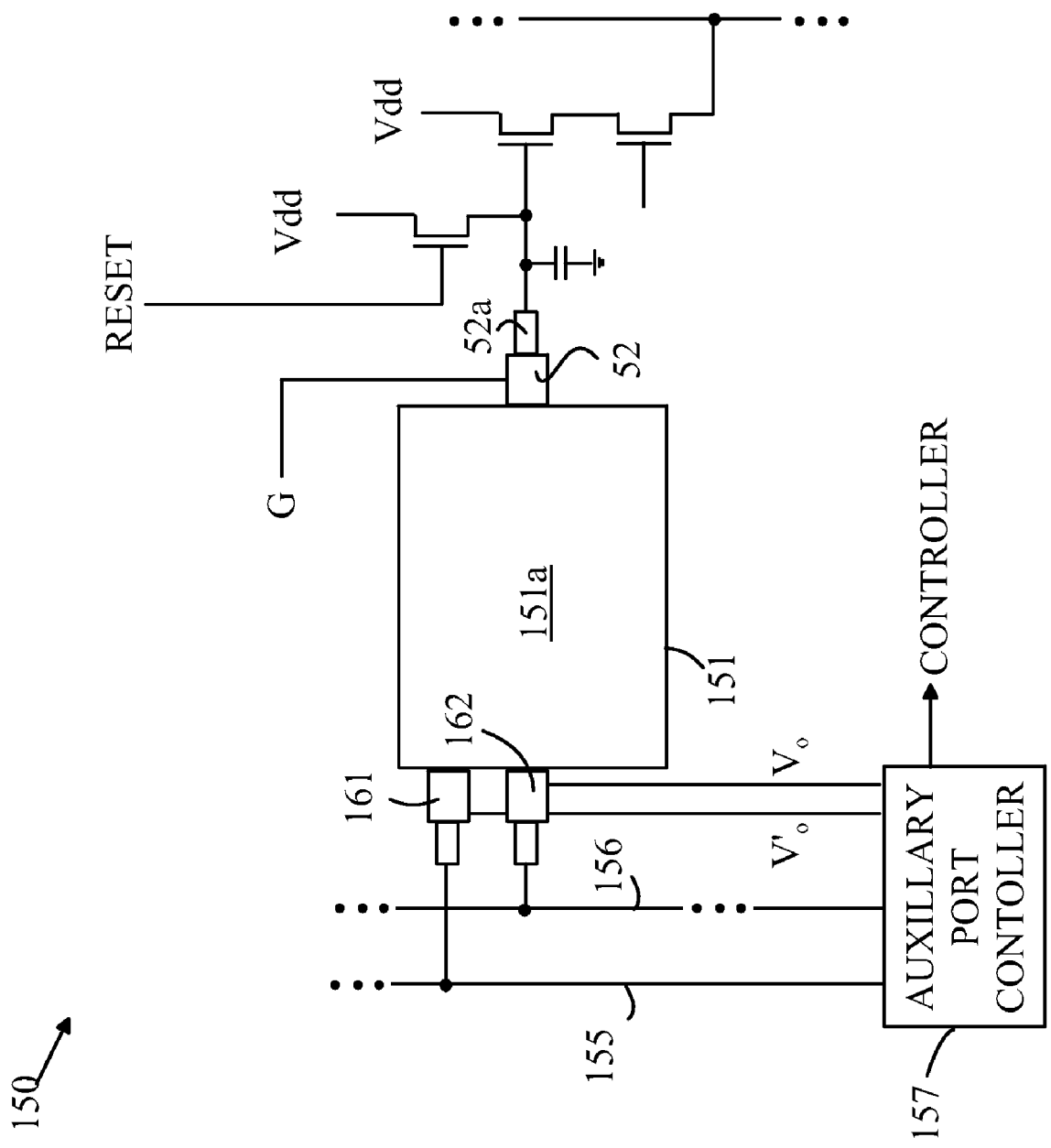
FIG. 7 illustrates the three-ported photodiode according to another embodiment of the present invention.

Refer now to FIG. 7, which illustrates the three-ported photodiode according to another embodiment of the present invention. Pixel 150 includes a three-ported photodiode 151 having a light conversion and charge accumulation area 151a. During the resetting and readout of photodiode 151, gate 52 is used in a manner analogous to that discussed above. Photodiode 151 also has two auxiliary ports that are controlled by gates 161 and 162 and that are connected to overflow buses 155 and 156, respectively. The potentials on gates 161 and 162 are controlled separately via auxiliary port controller 157. When pixel 150 is being operated as part of a first subset of pixels, gate 162 is set to a potential at or above that of gate 52 to effectively turn off gate 162. In this configuration, the current on bus 155 is measured to determine and control the exposure. When pixel 150 is being operated as part of a second subset of pixels, gate 161 is set to a potential at or above that of gate 52, and the current on bus 156 and the potential on gate 162 are used to determine and control the exposure. The auxiliary gates in the pixels that are not part of the subset in question during the exposure are set to the same potential as the auxiliary gates corresponding to the subset that is being utilized. That is, when the potential is being varied on gate 162, the auxiliary gates in all other pixels in the imaging array are set to the same potential as gate 162. If any of those pixels have additional auxiliary gates, those additional gates are inactivated by setting the potential on those additional gates to a potential above that on gate 52.

The above-described embodiments of the present invention utilize a separate second port controller. However, embodiments in which the second port controller is included in the array controller can also be constructed.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent to those skilled in the art from the foregoing description and accompanying drawings. Accordingly, the present invention is to be limited solely by the scope of the following claims.

What is claimed is:

1. An apparatus comprising:
   an array of pixel sensors, each pixel sensor comprising a dual-ported photodiode or photogate characterized by ports having first and second gates, and a charge conversion circuit, said charge conversion circuit generating a signal that is a function of a charge on said dual-ported photodiode when said first gate in said dual-ported photodiode is activated to transfer a charge on said dual-ported photodiode to said charge conversion circuit; and
   a controller that applies a potential to said second gates in said dual-ported photodiodes and measures a current flowing out of said second gates, said controller measuring said current when said applied potential is set such that all photoelectrons accumulated in said photodiodes pass through said second gates.

2. The apparatus of claim 1 wherein said controller determines an average light intensity incident on said array of pixel sensors from said measured current.

3. The apparatus of claim 1 wherein said controller further measures said current flowing out of said second gates during an image exposure and terminates said exposure if said current exceeds a predetermined threshold value.

4. The apparatus of claim 1 wherein said second ports of said dual-ported photodiodes in a sub-set of said pixel sensors are connected to an overflow bus and said controller measures a current flowing in said overflow bus, said sub-set of said pixel sensors omitting at least one pixel sensor from said array of pixel sensors.

5. The apparatus of claim 4 wherein said sub-set of said pixels comprises pixels in a predetermined region of said imaging array and not pixels in other regions.

6. An apparatus comprising:
   an array of pixel sensors, each pixel sensor comprising a dual-ported photodiode or photogate characterized by ports having first and second gates, and a charge conversion circuit, said charge conversion circuit generating a signal that is a function of a charge on said dual-ported photodiode when said first gate in said dual-ported photodiode is activated to transfer a charge on said dual-ported photodiode to said charge conversion circuit; and
   a controller that applies a potential to said second gates in said dual-ported photodiodes and measures a current flowing out of said second gates as a function of said potential applied to said second gates after said array of pixel sensors has been exposed to an image, said current being measured at a plurality of different potentials on said second gates.

7. An apparatus comprising:
   an array of pixel sensors, each pixel sensor comprising a dual-ported photodiode or photogate characterized by ports having first and second gates, and a charge conversion circuit, said charge conversion circuit generating a signal that is a function of a charge on said dual-ported photodiode when said first gate in said dual-ported photodiode is activated to transfer a charge on said dual-ported photodiode to said charge conversion circuit; and
   a controller that applies a potential to said second gates in said dual-ported photodiodes and measures a current flowing out of said second gates, each second port passing charge stored in said photodiode connected to said second port when a potential in said photodiode exceeds said applied potential,
wherein one of said dual-ported photodiodes comprises a third port having a third gate and said controller controls a potential on said third gate.

8. The apparatus of claim 7 wherein said second port of said dual-ported photodiode is connected to a first overflow bus and said third port of said dual-ported photodiode is connected to a second overflow bus and said controller measures a current flowing in said first overflow bus or said second overflow bus.

9. A method for determining an exposure time for recording an image, said method comprising:
projecting said image on an array of pixel sensors, each pixel sensor comprising a dual-ported photodiode or photogate characterized by first and second gates that are connected to first and second gate potentials, respectively;
maintaining said first gate potential at a first potential and said second gate at a second potential that is less than said first potential; and
measuring a current flowing out of said second gates when said second potential is set such that all photoelectrons generated by said photodiodes flow out of said second gates.

10. The method of claim 9 further comprising measuring a current flowing from said second ports of a predetermined sub-set of said pixel sensors.

11. The method of claim 10 wherein said sub-set of said pixels comprises pixels in a predetermined region of said imaging array and not pixels in other regions.

12. The method of claim 10 wherein said current is also measured during an exposure of an image to be recorded.

13. The method of claim 10 wherein said current flowing out of said second gates of said sub-set of said pixel sensors is measured during an image exposure and said exposure is terminated if said current exceeds a predetermined threshold value.

14. The method of claim 9 wherein said exposure time is determined during a first exposure and wherein said image is then recorded during a subsequent exposure having a duration determined by said exposure time.

15. A method for determining an exposure time for recording an image, said method comprising:
projecting said image on an array of pixel sensors, each pixel sensor comprising a dual-ported photodiode or photogate characterized by first and second gates that are connected to first and second gate potentials, respectively;
measuring said current flowing out of said second gates as a function of said second potential for a plurality of different potentials on said second gates after said array of pixel sensors has been exposed to said image for a predetermined period of time; and
determining said exposure time from said measured current as a function of said second potential.

16. The method of claim 15 wherein a frequency distribution of light intensity values in said image is determined from said measured currents.

17. A method for determining an exposure time for recording an image, said method comprising:
projecting said image on an array of pixel sensors, each pixel sensor comprising a dual-ported photodiode or photogate characterized by first and second gates that are connected to first and second gate potentials, respectively;
maintaining said first gate potential at a first potential and said second gate at a second potential that is less than said first potential; and
measuring a current flowing out of said second gates,
wherein one of said dual-ported photodiodes comprises a third port having a third gate and a potential on said third gate is controlled independent of said potential on said second gate.

18. The method of claim 17 wherein a current leaving said third gate is measured in determining said exposure.

* * * * *